R. Heneage,
Hose Coupling,
N° 25,117. Patented Aug. 16, 1859.
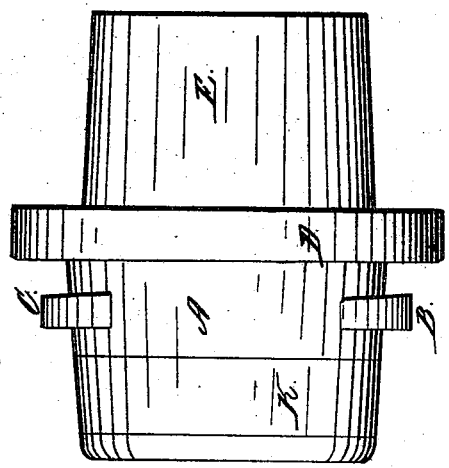
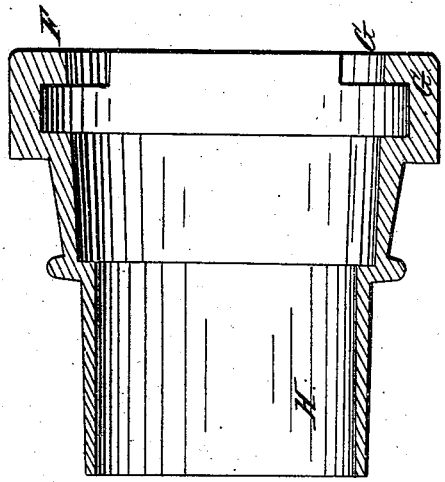
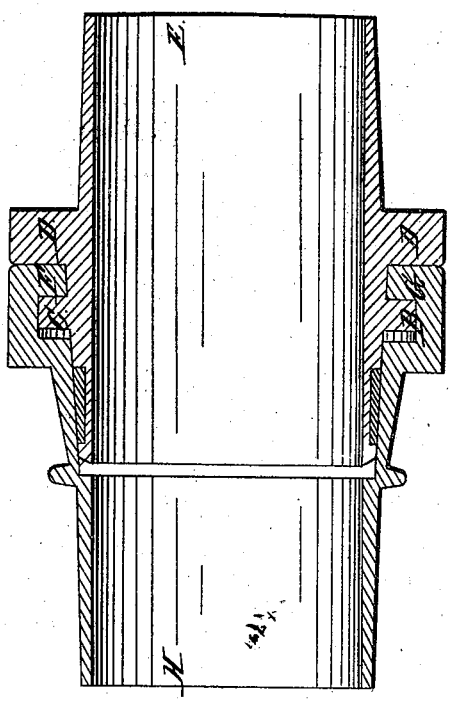
Witnesses:
W. H. Forbush
A. M. Wheeler
Inventor:
Rob't Heneage

UNITED STATES PATENT OFFICE.

ROBT. HENEAGE, OF BUFFALO, NEW YORK.

HOSE-COUPLING.

Specification of Letters Patent No. 25,117, dated August 16, 1859.

*To all whom it may concern:*

Be it known that I, ROBERT HENEAGE, of the city of Buffalo, county of Erie, and State of New York, have invented certain new and useful Improvements in Hose-Couplings; and I do hereby declare that the following is a full, clear, and exact description of the same, reference being had to the accompanying drawings, making a part of this specification, and the letters of reference marked thereon, in which—

Figure I is a section of the female part of the coupling. Fig. II is an elevation of the male part of the coupling. Fig. III is a longitudinal section of the coupling when the parts are coupled together.

Like letters refer to like parts in each of the figures.

The male part of the coupling has a conical part (A) on which two screw segments (B and C) are formed. A shoulder (D) is also formed at the base of the conical part. The hose is attached in the usual manner to the cylindrical extension (E). The female part is turned out to an internal conical surface corresponding to the external surface of the conical part and into which the said conical part is made to fit with about the same degree of nicety as the key or plug of a stop cock (as shown in Fig. III). Internal segments of a screw (F and G) corresponding to the external segments on the conical part are made in the female part. The hose is attached to the part (H) in the same manner as to the part (E). When the two parts of the coupling are brought together the conical part (A) enters the female part of the coupling, the screw segments (B and C) entering in the spaces between the internal segments F and G until they pass behind said segments when by turning the male part in the proper direction they will be held firmly together the shoulder of the female part being brought closely in contact with the shoulder (D) on the male part—the screw segments (B and C) being made to fit closely in the internal screw segments formed in the female part and the conical part (A) fitting firmly and water tight in its corresponding part in the female part of the coupling so that no water can pass or get into the chamber allowed to the screw sections. This conical part is extended far enough beyond the screw sections so as to form a long splice with the female part beyond the screw sections which will strongly support both parts and take the strain from the screw sections and thereby make a much stronger and more reliable coupling. This extension of the cone so far beyond the screw sections in connection with the shoulder (D) also forms a protection to the screw sections and prevents them from becoming marred or bruised by being drawn over the pavement when uncoupled and used with the hose of a fire engine.

Upon the cone extension and beyond the screw sections I place a packing of rubber or leather as represented at (K). A circular recess is made in this extension for the purpose of holding and receiving the packing. This packing is added when the coupling is used for the hose of a fire engine and when used for this purpose it is not necessary to make so perfect a fit of the cone extension in its corresponding female part. When the coupling is used for locomotive, water, or steam pipes; this packing is not used. In such case the extension of the cone beyond the screw sections is made a perfect "ground fit," water and steam tight.

I claim—

The arrangement of the screw sections (B and C) and packing (K) upon the cone extension (A) as herein described.

ROBT. HENEAGE.

Witnesses:
W. H. FORBUSH,
A. M. WHEELER.